United States Patent [19]
Hosono et al.

[11] Patent Number: 5,904,358
[45] Date of Patent: May 18, 1999

[54] CHUCK DEVICE

[75] Inventors: Masayuki Hosono, Tokyo; Jiro Mandokoro, Ibaraki-ken, both of Japan

[73] Assignee: SMC Kabushiki Kaisha, Tokyo, Japan

[21] Appl. No.: 08/915,809

[22] Filed: Aug. 21, 1997

[30] Foreign Application Priority Data

Sep. 6, 1996 [JP] Japan ..................................... 8-236782

[51] Int. Cl.$^6$ ..................................................... B23B 5/22
[52] U.S. Cl. ......................... 279/115; 269/126; 279/4.12; 294/106; 901/37
[58] Field of Search ................................. 279/4.01, 4.12, 279/106; 294/106, 115; 901/31, 37; 169/126

[56] References Cited

U.S. PATENT DOCUMENTS

| | | | |
|---|---|---|---|
| 4,607,873 | 8/1986 | Nusbuamer et al. .................. | 294/106 |
| 5,383,697 | 1/1995 | Roudant ................................. | 294/115 |
| 5,509,707 | 4/1996 | Schuaer ................................. | 901/37 |
| 5,639,136 | 6/1997 | Rosengren et al. .................... | 901/37 |

*Primary Examiner*—Daniel W. Howell
*Assistant Examiner*—Monica Smith
*Attorney, Agent, or Firm*—Morgan & Finnegan, LLP

[57] ABSTRACT

A chuck device has a pair of grippers pivotally supported in a recess defined in an end of a body for angular movement about a predetermined angle, a joint member connected to a piston reciprocally movably disposed in a cylinder chamber defined in the body, and a pair of rollers engaging respectively in grooves in the grippers and angularly movably mounted on the joint member. Linear movement of the piston can be transmitted as angular movement to the grippers through the rollers while the rollers are angularly moving with respect to the joint member. A cover is mounted on the end of the body in closing relation to the recess.

17 Claims, 5 Drawing Sheets

CHUCK DEVICE

BACKGROUND OF THE INVENTION

1. Field of the Invention

The present invention relates to a chuck device having a pair of grippers that are angularly movable under the pressure of a fluid respectively into substantially parallel positions for gripping a workpiece.

2. Description of the Related Art

Heretofore, chuck devices have been used to grip workpieces. FIG. 5 of the accompanying drawings shows a conventional chuck device 1. As shown in FIG. 5, the conventional chuck device 1 comprises a body 2 having a cylinder chamber 3 defined therein and a. piston mechanism 5 having a piston 4 reciprocally movable axially in the cylinder chamber 3. The piston mechanism 5 also has a piston rod 6 with an outer end thereof projecting out of the body 2, and a plate 7 is fixed to the outer end of the piston rod 6. A pair of grippers 10a, 10b is connected to respective opposite ends of the plate 7 by respective joint plates 9a, 9b that are pivotally supported on the plate 7 by pins 8a, 8b. The grippers 10a, 10b are angularly movably supported in a recess 12 defined in the body 2 by respective pins 11a, 11b.

When the grippers 10a, 10b are angularly moved 90° toward each other, as indicated by the solid lines, about the pins 11a, 11b by the piston rod 6 which is retracted into the body 2. the grippers 10a, 10b grip a workpiece (not shown). When the grippers 10a, 10b are angularly moved 90° away from each other, as indicated by the two-dot-and-dash lines, about the pins 11a, 11b by the piston rod 6 which projects out of the body 2, the grippers 10a, 10b releases the workpiece.

With the conventional chuck device 1, linear movement of the piston rod 6 is converted into angular movement of the grippers 10a, 10b by the joint plates 9a, 9b.

The pins 8a, 8b and the pins 11a, 11b are spaced from each other by respective interaxial distances $A_1$, $A_2$. These interaxial distances $A_1$, $A_2$ may be different from each other due to dimensional errors. If the interaxial distances $A_1$, $A_2$ are different from each other, then the grippers 10a, 10b may not extend parallel to each other when they are angularly moved toward each other. Accordingly, the grippers 10a, 10b may fail to provide a required level of accuracy about parallelism therebetween when angularly moved toward each other.

Dust or dirt particles that find their way into the opening 12 tend to be attached to the pins 8a, 8b, 11a, 11b and unduly wear them to the point where the grippers 10a, 10b cannot smoothly be angularly moved about these pins.

When the grippers 10a, 10b are angularly moved a certain angle, gaps 13 are created between the body 2 and the grippers 10a, 10b, allowing dust or dirt particles to enter the opening 12.

SUMMARY OF THE INVENTION

It is a general object of the present invention to provide a chuck device having a pair of grippers that can be held parallel to each other with a required level of accuracy for gripping a workpiece therebetween.

A principal object of the present invention is to provide a chuck device having a pair of grippers that are smoothly openable and closable for quickly and reliably releasing and gripping a workpiece therebetween.

Another object of the present invention is to provide a chuck device having a body which prevents dust and dirt particles from entering into a region where a pair of grippers is angularly movably supported.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
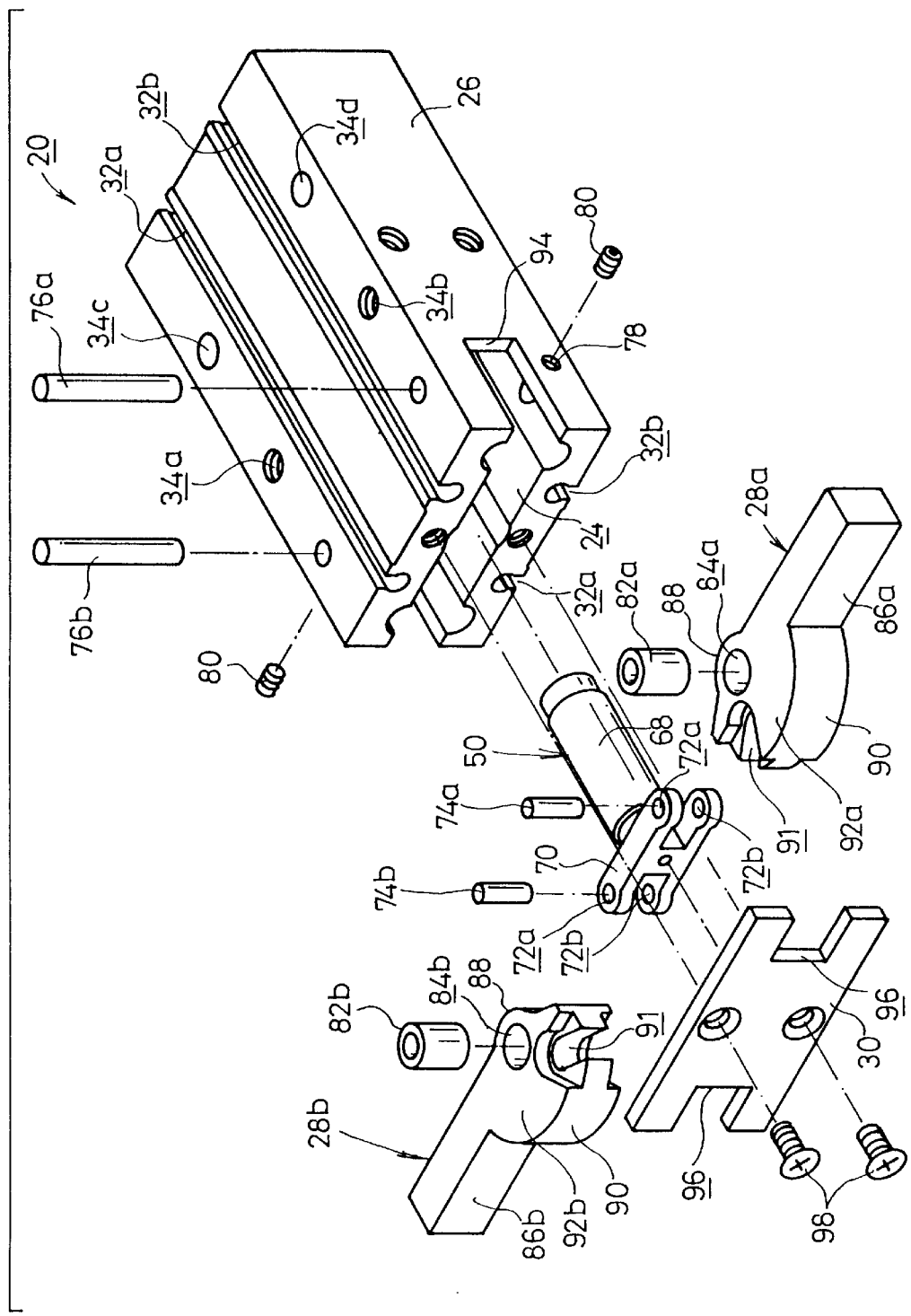
FIG. 1 is an exploded perspective view of a chuck device according to an embodiment of the present invention.

As shown in FIG. 1, a chuck device 20 according to an embodiment of the present invention basically comprises a body 26 in the form of a rectangular parallelepiped having apair of fluid pressure inlet/outlet ports 22a, 22b (see FIGS. 2 and 3) defined in one side thereof and a recess 24 defined in an end thereof, a pair of grippers 28a, 28b pivotally supported in the recess 24 for angular movement through a certain angle, and a cover 30 fastened to the end of the body 26 by screws in closing relation to the recess 24.

The body 26 has a pair of opposite side surfaces each having a pair of substantially parallel grooves 32a, 32b of arcuate cross section defined therein and extending longitudinally along the body 26. Sensors (not shown) are mounted in the grooves 32a, 32b at given positions. The body 26 also has four attachment holes 34a, 34b, 34c, 34d defined transversely therethrough, and a through hole 36 (see FIGS. 2 and 3) defined longitudinally therein in conmunication with the recess 24.

The through hole 36 is closed off at its both ends, defining a cylinder chamber 38 in the body 26. A piston mechanism has a piston 42 that is slidably disposed in the cylinder chamber 38. The through hole 36 has an outer end closed by a cap 46 mounted in the body 26 with a retaining ring 44 interposed therebetween, and an opposite end closed by a joint member 50 fastened to the piston 42 by a bolt 48 and a ring-shaped packing 52 surrounding the joint member 50. Specially shaped O-rings 54, 56 are mounted respectively on the cap 46 and the bolt 48 for hermetically sealing them.

The piston 42 has a plurality of annular grooves defined in its outer circumferential surface and receiving an annular magnet 58, an annular packing 60, and a wear ring 62 respectively therein. An annular damper 64 is attached to an end of the piston 42 where the joint member 50 is mounted, for dampening shocks that are applied when the piston 42 reaches one of the ends of its stroke.

The joint member 50 is of a substantially T shape, and comprises a cylindrical member 68 slidably fitted in a bushing 66 that is fixedly mounted in the body 26 adjacent to the ring-shaped packing 52, and a coupling 70 integral with an outer end of the cylindrical member 68 remote from the bolt 48. The coupling 70 has an H-shaped cross section, and has two pairs of holes 72a, 72b defined respectively in the opposite ends thereof. Cylindrical rollers 74a, 74b are rotatably loosely fitted in the pairs of holes 72a, 72b, respectively.

The grippers 28a, 28b are angularly movably attached to the body 26 by respective shafts 76a, 76b which are secured to the body 26 by setscrews 80 that are threaded into threaded holes 78 defined in the sides of the body 26. The grippers 28a, 28b have respective holes 84a, 84b defined therein which receive respective cylindrical bushings 82a, 82b therein. The grippers 28a, 28b are angularly movably supported by the respective shafts 76a, 76b and the bushings 82a, 82b fitted around the shafts 76a, 76b.

Figure 2:
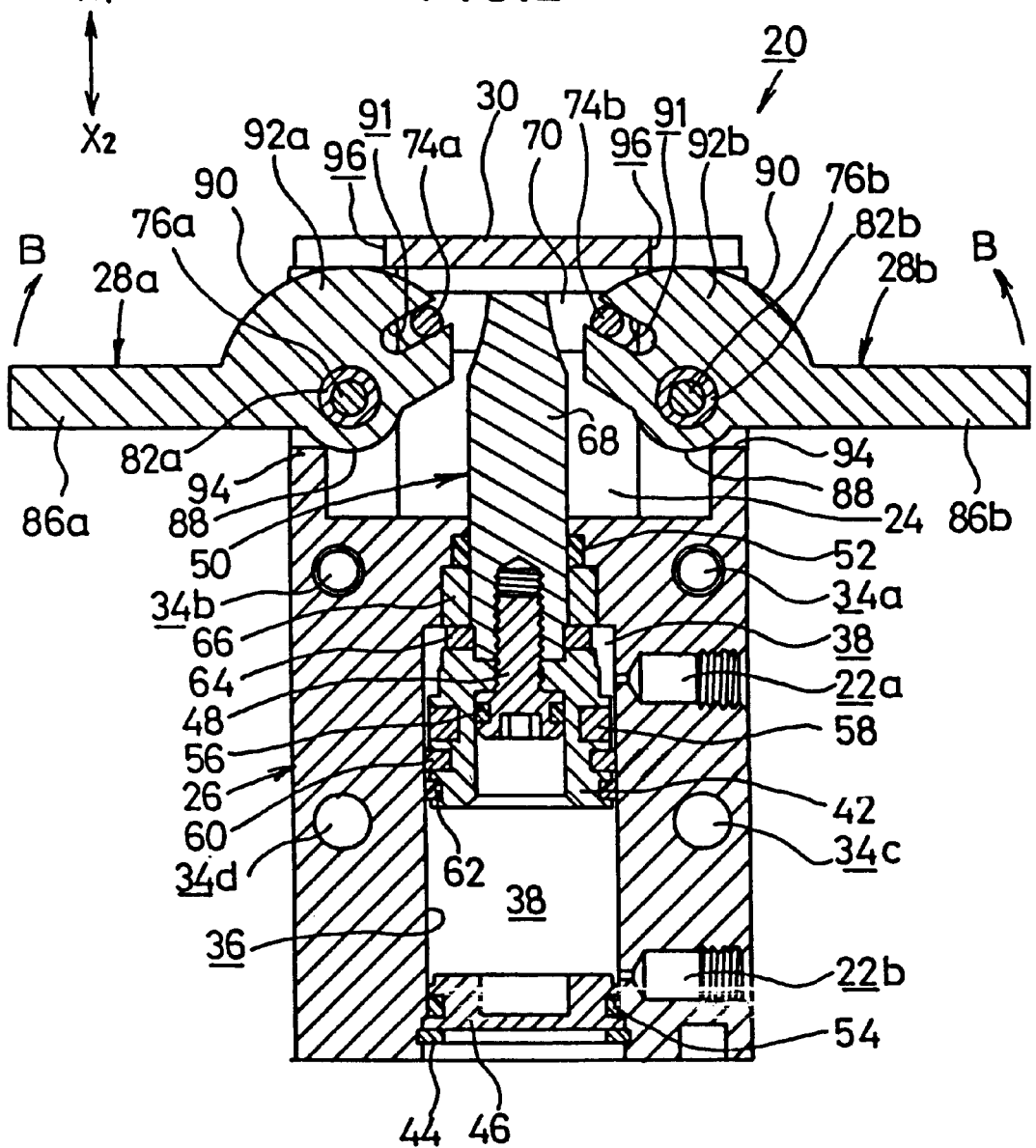
FIG. 2 is a vertical cross-sectional view of the chuck device shown in FIG. 1 with a pair of grippers spreading into a substantially horizontal position.
Figure 3:
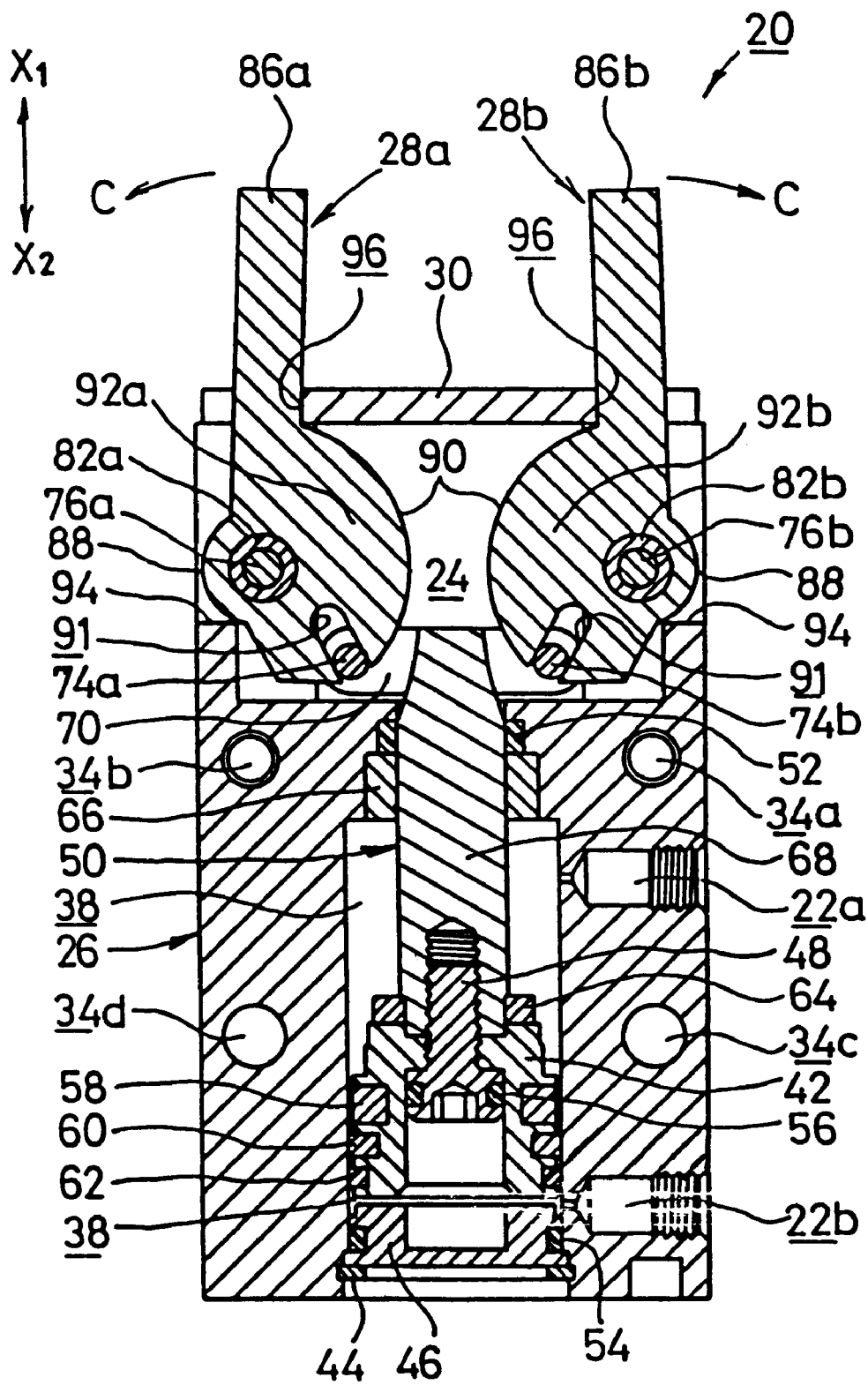
FIG. 3 is a vertical cross-sectional view of the chuck device shown in FIG. 1 with the grippers brought together into a substantially parallel position.

The grippers 28a, 28b comprise respective fingers 86a, 86b for gripping a workpiece (not shown) directly or through other members (not shown) coupled to the fingers 86a, 86b, and respective turn members 92a, 92b having respective disk-shaped bodies each having first and second outer curved surfaces 88, 90 having different radii of curvature. The turn members 92a, 92b have respective slots 91 of a U-shaped cross section which receive the rollers 74a, 74b respectively therein. As shown in FIGS. 2 and 3, the fingers 86a, 86b are angularly movable about 90° about the respective shafts 76a, 76b.

The first curved surfaces 88 having a smaller radium of curvature slidably engage respective corners 94 of the body 26, and the second curved surfaces 90 having a greater radium of curvature slidably engage edges of rectangular recesses 96 defined in the cover 30, for thereby preventing dust and dirt particles from entering into the recess 24 in the body 26.

As shown in FIG. 1, the cover 30 which closes the recess 24 has a substantially H shape, and is fastened to the end of the body 26 by screws 98. When the fingers 86a, 86b abut against the edges of the recesses 96 in the cover 30, the cover 30 stops further angular movement of the fingers 86a, 86b. Therefore, the cover 30 serves as a stopper for establishing an end of the stroke of angular movement of the fingers 86a, 86b.

Operation and advantages of the chuck device 20 will be described below.

The fluid pressure inlet/outlet ports 22a, 22b are connected to a fluid pressure supply (not shown) through tubes or the like, and sensors (not shown) are mounted in the grooves 32a, 32b at given positions. Initially, as shown in FIG. 2, the fingers 86a, 86b of the grippers 28a, 82b are open, i.e., angularly displaced away from each other.

Thereafter, the fluid pressure supply is actuated to supply a fluid under pressure to the fluid pressure inlet/outlet port 22a. The other fluid pressure inlet/outlet port 22b is vented to the atmosphere by a directional control valve (not shown).

The fluid under pressure supplied to the fluid pressure inlet/outlet port 22a is introduced into the cylinder chamber 38 on one side of the piston 42, pushing the piston 42 in the direction indicated by the arrow $X_2$. Under the supplied fluid pressure, the piston 42 and the joint member 50 are displaced linearly in unison with each other in the direction indicated by the arrow $X_2$. When the joint member 50 is displaced linearly in the direction indicated by the arrow $X_2$, the rollers 74a, 74b engaging in the slots 91 press the grippers 28a, 28b in the direction indicated by the arrow $X_2$. As a result, while the rollers 74a, 74b engaging in the slots 91 rotate about their axes, the grippers 28a, 28b are angularly moved approximately 90° about the respective shafts 76a, 76b in the directions indicated by the arrows B until they reach the position shown in FIG. 3.

In the position shown in FIG. 3, the fingers 86a, 86b of the grippers 28a, 28b abut against the cover 30, reaching an end of its stroke of angular movement, and extend substantially parallel to each other to grip a workpiece (not shown).

In order to release the workpiece, the non-illustrated directional control valve is operated to supply a fluid under pressure into the cylinder chamber 38 from the fluid pressure inlet/outlet port 22b for displacing the piston 42 in the direction indicated by the arrow $X_1$. Under the supplied fluid pressure, the piston 42 and the joint member 50 are displaced linearly in unison with each other in the direction indicated by the arrow $X_1$. The grippers 28a, 28b are now angularly moved in the directions indicated by the arrows C. The grippers 28a, 28b reach the other end of the stroke of angular movement when the damper 64 mounted on the piston 42 abuts against the bushing 66, whereupon the grippers 28a, 28b return to the initial position shown in FIG. 2.

In this embodiment, the rollers 74a, 74b engaging in the U-shaped slots 91 of the grippers 28a, 28b are angularly movably loosely fitted in the holes 72a, 72b of the joint member 50. When the grippers 28a, 28b are angularly moved, the rollers 74a, 74b engaging in the U-shaped slots 91 are turned with the grippers 28a, 28b, allowing the grippers 28a, 28b to turn smoothly with applying large frictional forces to the rollers 74a, 74b.

Figure 5:
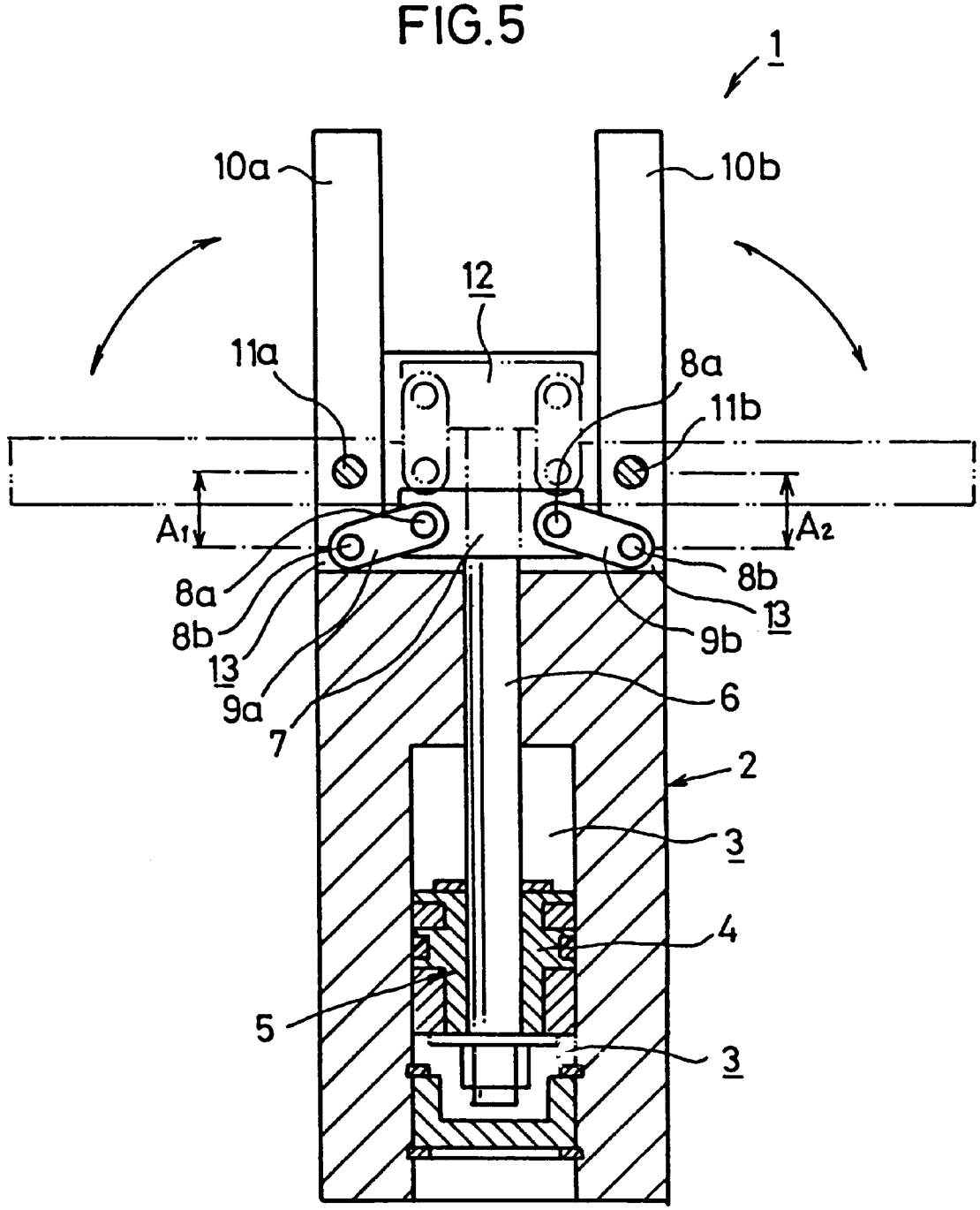
FIG. 5 is a cross-sectional view of a conventional chuck device.

Furthermore, linear movement of the joint member 50 is transmitted to the grippers 28a, 28b through the rollers 74a, 74b. Therefore, no joint plates such as the conventional joint plates 9a, 9b shown in FIG. 5 are required. The grippers 28a, 28b can be maintained parallel to each other at a desired level of accuracy.

The turn members 92a, 92b of the grippers 28a, 28b each have the first and second outer curved surfaces 88, 90 which slidably engage the body 26 and the cover 30 at all times. Therefore, no gap is created between the grippers 28a, 28b, the body 26, and the cover 30 when the grippers 28a, 28b are angularly moved between the ends of their stroke of angular movement.

Specifically, when the grippers 28a, 28b are angularly moved, the corners 94 of the body 26 remain in sliding contact with the first curved surfaces 88, and the edges of the rectangular recesses 96 in the cover 30 remain in sliding contact with the second curved surfaces 90. Therefore, no gap is created between the grippers 28a, 28b, the body 26, and the cover 30 when the grippers 28a, 28b are angularly moved. As a result, dust and dirt particles are prevented from finding their way into the recess 24 in the body 26.

The cover 30 mounted on the end of the body 26 closes the space between the grippers 28a, 28b for thereby preventing dust and dirt particles from entering into the recess 24. As described above, the cover 30 serves as a stopper for establishing an end of the stroke of angular movement of the fingers 86a, 86b when the edges of the recesses 96 engage the fingers 86a, 86b.

Since dust and dirt particles are prevented from entering into the recess 24, the shafts 76a, 76b and the bushings 82a, 82b, about which the grippers 28a, 28b are angularly movable, are protected against undue wear and damage. The angularly movable grippers 28a, 28b are thus highly durable in operation.

Figure 4:
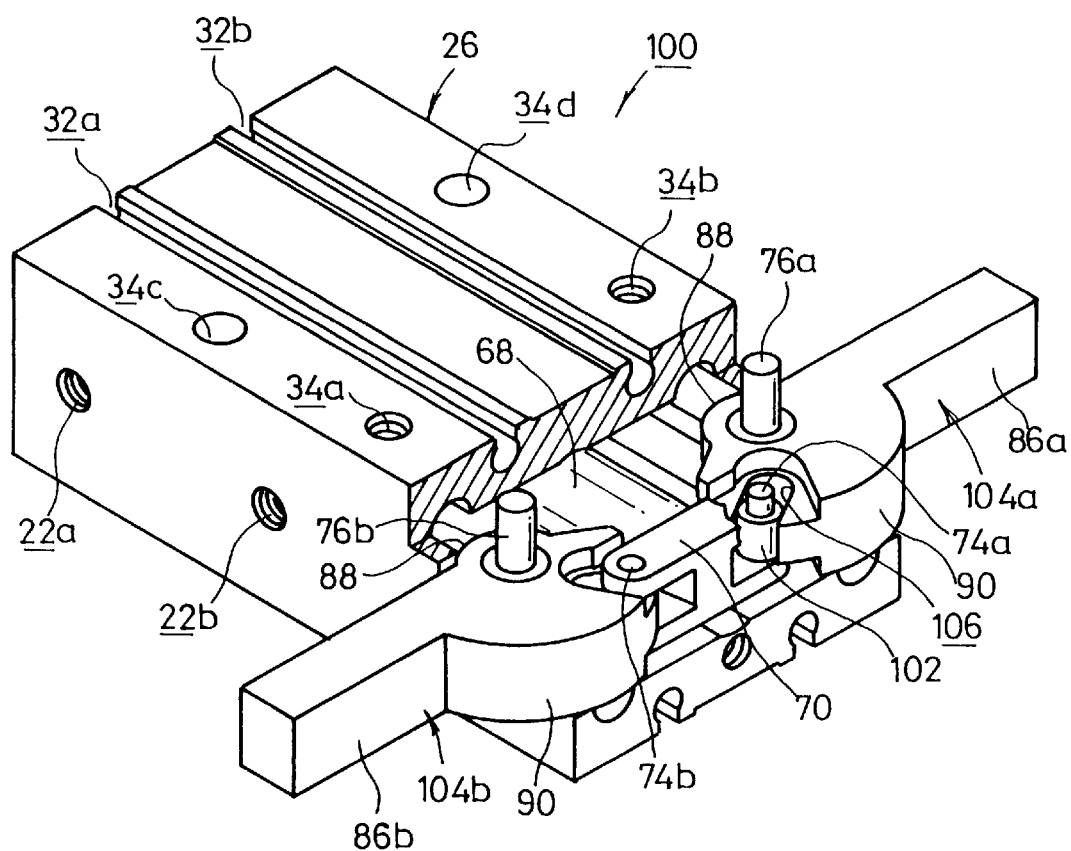
FIG. 4 is a perspective view, partly cut away, of a chuck device according to another embodiment of the present invention.

FIG. 4 shows a chuck device 100 according to another embodiment of the present invention. Those parts shown in FIG. 4 which are identical to those shown in FIGS. 1 through 3 are denoted by identical reference numerals and representations, and will not be described in detail below.

In the chuck device 100, tubular sleeves 102 are loosely fitted over the respective rollers 74a, 74b, and engage in respective U-shaped slots 106 defined in respective grippers 104a, 104b. The tubular sleeves 102 serve to increase the diameter of assemblies of the rollers 74a, 74b and the tubular sleeves 102 which engage the grippers 104a, 104b. With the increased diameter of those assemblies, it is possible to angularly move the grippers 104a, 104b with smaller forces than would be required if no such tubular sleeves were used.

The chuck device 100 operates in the same manner and offers the same advantages as with the chuck device 20 shown in FIGS. 1 through 3.

Although certain preferred embodiments of the present invention has been shown and described in detail, it should be understood that various changes and modifications may be made therein without departing from the scope of the appended claims.

What is claimed is:

1. A chuck device comprising:
    a body having a pair of fluid pressure inlet/outlet ports, a cylinder chamber defined therein, and a recess defined in an end of the body;
    a piston mechanism having a piston reciprocally movable axially in said cylinder chamber;
    a pair of grippers pivotally movably supported in said recess for angular movement about a predetermined angle, wherein each of said grippers has a slot defined therein;
    a joint member connected to said piston; and
    a pair of rollers engaging respectively in said slots and angularly movably mounted on said joint member, whereby linear movement of said piston can be transmitted as angular movement to said grippers through said rollers while the rollers are angularly moving with respect to said joint member.

2. A chuck device according to claim 1, further comprising a cover mounted on the end of said body in closing relation to said recess.

3. A chuck device according to claim 2, wherein each gripper comprises a finger and a turn member, said turn member having a first curved surface slidably engaging said body and a second curved surface slidably engaging said cover.

4. A chuck device according to claim 2, wherein said cover serves as a stopper for establishing an end of a stroke of angular movement of said grippers.

5. A chuck device according to claim 1, further comprising a pair of tubular sleeves angularly movably loosely fitted over said rollers, respectively.

6. A chuck device according to claim 1, wherein each of said slots has a U-shaped cross section.

7. A chuck device according to claim 3, wherein said body has corners and said cover has rectangular recesses defined therein, said first curved surfaces being held in slidable engagement with said corners and said second curved surfaces being held in slidable engagement with edges of said rectangular recesses.

8. A method for gripping a workpiece, the method comprising:
    displacing linearly in unison with each other a joint member and a piston located within a body, the body comprising a first end and a recess, the joint member comprising holes wherein a pair of rollers are movably fitted;
    rotating a pair of grippers attached to the body, each gripper comprising a slot and a finger, said rotating comprising:
        engaging the rollers in the slots, wherein each roller has an axis and rotates about its axis when engaging in its corresponding slot;
        driving the rollers along their corresponding slots thereby rotating each gripper; and
    preventing foreign particles from entering the recess of the body.

9. A method according to claim 8, wherein the body further comprises an inlet/outlet port and a chamber, the method further comprising introducing a fluid under pressure through the inlet/outlet port and into the chamber thereby displacing the piston and joint member.

10. A method according to claim 8, wherein the grippers are rotated toward each other by displacing the piston and joint member toward the first end of the body.

11. A method according to claim 8, wherein the grippers are rotated away from each other by displacing the piston and joint member away from the first end of the body.

12. A method according to claim 8, further comprising terminating rotation of the grippers.

13. A method according to claim 12, wherein rotation of the grippers is terminated when the fingers abut against a cover.

14. A chuck device comprising:
    means for displacing linearly in unison with each other a joint member and a piston located within a body, the body comprising a first end and a recess, the joint member comprising holes wherein a pair of rollers are movably fitted;
    means for rotating a pair of grippers attached to the body, each gripper comprising a slot and a finger, said means for rotating comprising:
        means for engaging the rollers in the slots, wherein each roller has an axis and rotates about its axis when engaging in its corresponding slot;
        means for driving the rollers along their corresponding slots thereby rotating each gripper; and
    means for preventing foreign particles from entering the recess of the body.

15. A chuck device according to claim 14, further comprising means for introducing a fluid under pressure into the body thereby displacing the piston and joint member.

16. A chuck device according to claim 14, further comprising means for terminating rotation of the grippers.

17. A chuck device according to claim 16, wherein the means for terminating rotation of the grippers is abutting the fingers with a cover.

* * * * *